United States Patent [19]

Teller, Jr.

[11] 4,158,148
[45] Jun. 12, 1979

[54] LATCHING DETECTOR CIRCUIT

[76] Inventor: Howard S. Teller, Jr., 3810 Rose St., Shiller Park, Ill. 60176

[21] Appl. No.: 852,248

[22] Filed: Nov. 17, 1977

[51] Int. Cl.$^2$ .................. G08B 23/00; G08B 29/00; H03K 1/10; H03K 17/28

[52] U.S. Cl. ................ 307/233 R; 307/261; 340/539; 340/658; 325/364; 331/113 R; 328/138

[58] Field of Search ............... 328/22, 138; 307/261, 307/233 R; 331/113 R, 145; 340/658, 659, 539; 325/364, 466

[56] References Cited

U.S. PATENT DOCUMENTS

| | | | |
|---|---|---|---|
| 3,104,356 | 9/1963 | Hedger | 328/138 X |
| 3,449,695 | 6/1969 | Marsh | 307/261 X |
| 3,566,283 | 2/1971 | Diebler | 307/261 X |
| 3,653,018 | 3/1972 | Budrys | 340/658 |
| 3,792,290 | 2/1974 | Brocker | 307/233 R |
| 3,984,825 | 10/1976 | Fujita | 331/113 R |
| 4,039,959 | 8/1977 | Pattantyus-Abraham | 307/233 R |
| 4,072,903 | 2/1978 | Harris | 325/466 |

Primary Examiner—John S. Heyman
Attorney, Agent, or Firm—Gary, Juettner & Pyle

[57] ABSTRACT

A circuit for generating an indication in response to the occurrence of a predetermined condition is characterized by means for detecting the occurrence of the condition and for generating the indication after the condition has existed for a selected time. In a preferred embodiment of the circuit, the condition to be detected is a warning signal preceding a radio broadcast of a severe weather report, and the circuit includes an input stage for receiving the signal and for generating a control voltage which increases in value with increasing duration of the signal. The control voltage is applied to an input to a multivibrator, and after a first period of time increases to a value sufficient to place the multivibrator in an oscillating state. The output from the multivibrator is connected both with an alarm generator to indicate the occurrence of the warning signal, and is applied back to the input to the multivibrator through a feedback circuit to maintain the voltage thereat, after a second period of time, at a value which sustains operation of the multivibrator. This latches the alarm in an "on" condition until the multivibrator is reset to its non-oscillating or quiescent state.

8 Claims, 1 Drawing Figure

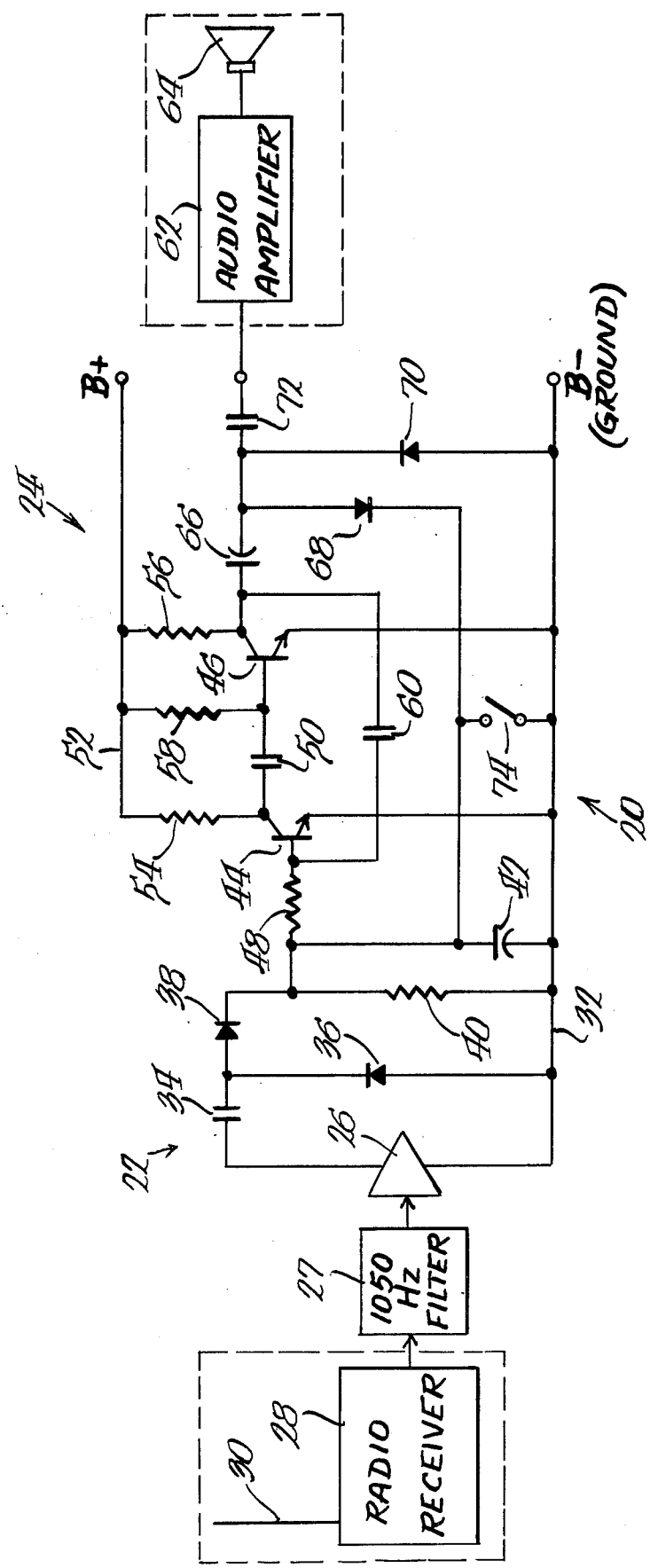

LATCHING DETECTOR CIRCUIT

BACKGROUND OF THE INVENTION

The present invention relates to detector circuits, and in particular to an improved latching detector circuit which is responsive to the occurrence of a predetermined condition to generate an alarm.

The National Weather Service broadcasts radio reports on weather conditions throughout the country. The reports are continuous, and cover both prevailing and expected weather conditions. Should a severe weather condition arise or likely be expected, in order to alert listeners to the report to the condition the broadcast is preceded by a 1050 Hz tone of 10 to 15 seconds duration. Thus, upon hearing the tone, a listener is forewarned or advised that the broadcast to follow will relate to a severe weather condition.

Manifestly, such reports are extremely valuable, if not indispensible, to persons in positions or undertaking activities which are or likely may be directly and/or adversely affected by the weather. Airplane pilots and boaters, for example, use such reports in deciding in the first instance whether to embark on a trip and, if so, in knowing what type of weather to expect or avoid. Civil defense, fire and police organizations also require the reports in order to be prepared for weather related contingencies, such as personal injury or property damage, and vacationers and other travelers may plan their activities on the basis thereof.

Severe weather conditions usually develop and occur rapidly, and it is possible that at the time a warning of the condition is broadcast the radio receiver monitoring the broadcast will be unattended. Should such occur, an individual or perhaps a municipality may be unaware of and unprepared for a severe and possibly damaging weather condition. Consequently, it is extremely desirable to provide some means for advising individuals who monitor receivers of weather broadcasts either that a severe weather report is imminent or that such a report has occurred in their absence.

OBJECTS OF THE INVENTION

The primary object of the present invention is to provide a circuit for monitoring the occurrence of a predetermined condition, and for generating an indication upon the occurrence of the condition.

Another object of the invention is to provide such a circuit which continues to generate the indication even after the detected condition ceases to exist.

A further object of the invention is to provide such a circuit for detecting the occurrence of the predetermined condition, and for generating the indication only after the condition has existed for a selected time.

A still further object of the invention is to provide such a circuit which readily may be reset from its indication generating condition to a quiescent condition after the condition to be detected has ceased to exist.

A still further object of the invention is to provide such a circuit which is particularly adapted to monitor radio broadcasts of weather reports, and to generate the indication upon the occurrence of a predetemined signal preceding the broadcast of a report on a severe weather condition, and to continue generating the indication until the circuit is reset.

SUMMARY OF THE INVENTION

In accordance with the present invention, a circuit for detecting a predetermined condition and for generating an indication upon the occurrence thereof, includes means responsive to the occurrence of the condition for generating a control voltage which increases in value with increasing duration of the condition, and oscillator means for receiving the control voltage and responsive to a preselected minimum value thereof to generate an output indicative of the occurrence of the condition.

In a preferred embodiment of the circuit the predetermined condition to be detected is an a.c. voltage signal, and the means responsive to the condition for generating the control voltage includes voltage doubling rectifier means and capacitive storage means. The voltage doubling rectifier means has an input for receiving the a.c. voltage signal, and an output connected with the capacitive means for generating the control voltage thereacross.

The oscillator means comprises a multivibrator circuit, having a nonoscillating and an oscillating state, connected at an input thereto with the capacitive means for receiving the control voltage. The multivibrabor is in the nonoscillating state whenever the control voltage is below the selected value, and in the oscillating state whenever the control voltage is at least equal to the selected value, so that upon the occurrence of the predetermined signal the multivibrator oscillates after a first period of time required for the control voltage to increase to the selected value. Means are connected with the output from the multivibrator for generating the indication whenever the multivibrator is in its oscillating state.

In order to continue to provide the indication that the a.c. voltage signal has occurred, even after the signal has terminated, a feedback circuit, which may comprise a voltage doubler rectifier, is connected between the output of and the input to the multivibrator, and upon the multivibrator being spaced in the oscillating state by the control voltage operates, after a second period of time, to maintain the voltage at the input to the multivibrator at a value sufficient to latch the multivibrator in its oscillating state. To remove the multivibrator from its oscillating state, or to unlatch the same, a manually manipulable switch is connected with the input thereto to decrease the value of the voltage thereat to a level insufficient to maintain oscillation of the multivibrator, whereby the circuit is reset to its quiescent state for again detecting, and generating an indication of, the occurrence of the predetermined signal.

The invention thus provides an improved latching detector circuit particularly suited, for example, for detecting a 1050 Hz tone which precedes a radio broadcast of a severe weather condition. By virtue of the first time period delay for generation of the indication the circuit is insensitive to sporadic occurrences of the predetermined condition (e.g., the 1050 Hz tone), and in combination with the second time period delay the circuit is latched in its indication generating condition only after the predetermined condition has existed for a time sufficient to ensure that a false indication is not generated.

The foregoing and other objects, advantages and features of the invention will become apparent upon a consideration of the following detailed description, when taken in conjunction with the accompanying drawings.

BRIEF DESCRIPTION OF THE DRAWING

The single drawing FIGURE is a schematic representation of a preferred embodiment of the circuit of the invention, which is adapted to detect the occurrence of a predetermined condition and to generate an indication of such occurrence until the circuit is reset.

DETAILED DESCRIPTION

Referring to the drawing, the circuit of the invention, indicated generally at 20, is particularly adapted to detect the occurrence of a predetermined condition, and to generate an indication thereof. The circuit generates the indication only upon the condition having existed for a selected time, and continues to generate the indication, even after the condition has ceased to exist, until such time as the circuit is reset. In a contemplated use of the circuit, the predetermined condition to be detected is a 1050 Hz tone signal which is broadcast by the National Weather Service immediately preceding a severe weather report, and the indication generated in response to detection of the condition may be, for example, an audible alarm. To prevent the occurrence of false alarms, the circuit responds only to a 1050 Hz tone of predetermined minimum duration, and to ensure that the alarm is detected even when the circuit is unattended, upon the occurrence of the particular tone for the minimum duration the circuit latches in its alarm generating condition. To unlatch the circuit, manually manipulable reset means are provided, all as will be described.

The circuit 20 includes an input section, indicated generally at 22, and a multivibrator section, indicated generally at 24. The input section 22 is for being connected with a signal representative of the condition to be detected, and in response to the signal generates a control voltage at an input to the multivibrator which increases in value with continued duration of the condition. Upon the control voltage reaching a selected value after a first period of time on the order of three seconds, the multivibrator 24 is placed in its oscillating state and provides a signal at its output. A feedback circuit is connected between the output from the multivibrator and the input thereto, and after the multivibrator has oscillated for a second period of time the feedback circuit sustains oscillation thereof until the multivibrator is reset to its nonoscillating state.

More particularly, where the predetermined condition to be detected is the occurrence of a 1050 Hz signal transmitted by the National Weather Service immediately prior to broadcast of a severe weather warning, the input section 22 includes an amplifier 26 connected at its input through a 1050 Hz filter 27 with the output from a radio receiver 28, having an antenna 30, tuned to the frequency of the National Weather Service broadcast. One side of the output from the amplifier 26 is connected with a conductor 32 to which is applied negative battery or ground reference, and the other side of the output is connected through a capacitor 34 to the cathode of a diode 36 and the anode of a diode 38. The anode of the diode 36 is connected with the conductor 32, and a resistor 40 and an electrolytic capacitor 42 are in parallel between the conductor 32 and the cathode of the diode 38. The capacitor 34 and the diodes operate as a voltage doubler rectifier, such that upon the occurrence of a 1050 Hz signal at the input to the amplifier 26 the output therefrom generates across the electrolytic capacitor 42 a control voltage which increases in value in accordance with the duration of the signal as limited by the resistor 40 which provides leakage across the capacitor.

The control voltage across the capacitor 42 is applied to the input to the multivibrator 24, and when the voltage increases to at least a selected value, representative of the occurrence of the 1050 Hz signal for at least a first period of time, the multivibrator is placed in its oscillating state. In the embodiment of the circuit shown, the multivibrator includes a first transistor 44 and a second transistor 46. The first transistor is connected at its base with the control voltage across the capacitor 42 through a resistor 48, at its emitter with the conductor 32, and at its collector both with the base of the transistor 46 through a capacitor 50, and with a positive voltage on a conductor 52 through a resistor 54. The transistor 46 is connected at its emitter with the conductor 32, and at its collector and base with the conductor 52 through a pair of resistors 56 and 58, respectively. To provide for oscillation of the multivibrator upon the control voltage being at least equal to the selected value, a capacitor 60 is connected between the collector of the transistor 46 and the base of the transistor 44.

In the quiescent or nonoscillating state of the multivibrator, the transistor 44 is nonconductive and the transistor 46 is conductive. Upon the occurrence of the predetermined condition for at least the first period of time, the control voltage across the capacitor 42 and at the base to the transistor 44 increases to at least the selected value and renders the transistor 44 conductive. Upon the transistor 44 becoming conductive, a negative going voltage transition is coupled through the capacitor 50 to the base of the transistor 46 to turn off the transistor 46. When this occurs, the potential at the collector of the transistor 46, which previously was approximately at that on the conductor 32, increases toward the potential on the conductor 52. Then, after the period of time required for the capacitor 50 to charge sufficiently through the resistor 58 to again render the transistor 46 conductive, the transistor again conducts and connects the potential on the conductor 32 with its collector. This provides a negative going voltage transition at the collector of the transistor 46, which is coupled through the capacitor 60 to the base of the transistor 44 to turn off the transistor. The transistor 44 then remains nonconductive until the capacitor 60 has charged sufficiently through the resistor 48 to again provide at the base of the transistor a voltage which renders the transistor conductive, whereupon the above described cycle of operation is repeated.

The output from the multivibrator at the collector of the transistor 46 is connected with an alarm generating means, which by way of example only may comprise an audio amplifier 62 for operating a speaker 64 to provide an audible indication that the 1050 Hz tone preceding a severe weather broadcast is being received. Without more, the alarm would stop after the tone ceased to be received, since at that time the voltage across the capacitor 42 would decrease to a level insufficient to render the transistor 44 conductive. To provide for continuous generation of an alarm for as long as is necessary to advise attending personnel that an emergency weather bulletin is being or has been received, and until such time as the circuit is reset, feedback means are provided between the output from the oscillator and the input thereto for sustaining oscillation of the multivibrator after an initial period of oscillation.

The feedback means advantageously may comprise an electrolylic capacitor 66 connected between the collector of the transistor 46 and the anode of a diode 68 and the cathode of a diode 70. The cathode of the diode 68 is connected with the juncture between the capacitor 42 and the resistor 48, the anode of the diode 70 is connected with the conductor 32, and the capacitor 66 and the diodes 68 and 70 together comprise a voltage doubler rectifier feedback circuit for applying the output from the multivibrator to the capacitor 42 for sustaining the control voltage thereacross, after the multivibrator has been in its oscillating state for a second period of time on the order of one to three seconds, at a value which maintains oscillation of the multivibrator even after the condition to be sensed and the output from the amplifier 26 no longer exist.

The alarm means is connected with the multivibrator output through the capacitor 66 and a coupling capacitor 72, and a normally open manually manipulable switch 74 is connected across the capacitor 42 for selectively discharging the same. The switch provides a means for resetting the multivibrator or terminating the oscillation thereof, whereby the circuit may conveniently and readily be reset from its alarm generating to its quiescent state simply by operating the switch.

The invention thus provides an improved circuit for monitoring or detecting the occurrence of a predetermined condition and for generating an indication in response thereto. The circuit includes means for delaying generation of the indication until the condition has occurred for a first minimum period of time, whereby the generation of false and/or spurios indications is minimized. The circuit also includes means for latching itself in an indication generating state after the condition has persisted for a second period of time following the first period, whereby the circuit is latched on only after the condition has existed for a sufficiently long period to ensure that a false indication is not generated, and so that if the circuit is unattended at the time the condition occurs, the indication thereof continues to be generated until such time as the circuit is again attended, and reset means is provided for selectively and conveniently resetting or unlatching the circuit. In a contemplated use of the circuit, the same is employed with a radio receiver tuned to the National Weather Service broadcast frequency, and provides the indication upon the occurrence of a 1050 Hz tone which precedes the broadcast of a severe weather report. Upon the occurrence of the tone for a predetermined period, the circuit warns personnel of the need to monitor the radio receiver to hear the broadcast, or if the same is unattended at the time of the broadcast provides a continuing indication that a severe weather report has occurred.

While one embodiment of the invention has been described in detail, various modifications and other embodiments thereof may be devised by one skilled in the art without departing from the spirit and scope of the invention, as defined by the appended claims.

What is claimed is:

1. A circuit for detecting the occurrence of a predetermined condition, comprising circuit means responsive to occurrence of the condition for generating a voltage which changes in value with increasing duration of the condition; oscillator means coupled at an input thereto with said circuit means and responsive to a selected value of said voltage to generate at an output therefrom a signal indicative of the occurrence of the condition; and feedback means coupled between said oscillator means output and input and responsive to said signal being generated for at least a predetermined time to control said oscillator means to maintain said signal at said output therefrom irrespective of the presence or absence of the condition.

2. A circuit for detecting the occurrence of a predetermined condition, comprising circuit means responsive to the condition for generating a voltage having an initial value in the absence of the condition, and a value which changes in a first direction upon the occurrence and with increasing duration of the condition and then in a second and opposite direction and to said initial value upon the absence of the condition, said voltage changing in the first direction to a selected value upon occurrence of the condition for a first period of time; oscillator means coupled at an input thereto with said voltage and responsive to said voltage having at least said selected value to generate at an output therefrom a signal indicative of the occurrence of the condition; and feedback circuit means coupled between said oscillator circuit means output and input and responsive to said signal being generated for at least a second period of time to control said oscillator means to maintain said signal at said output therefrom irrespective of the presence or absence of the condition.

3. A circuit for detecting the occurrence of a predetermined condition, comprising means responsive to the occurrence of said condition for generating a control voltage which increases in value with increasing duration of said condition, and oscillator means for receiving said control voltage and responsive to a preselected value thereof to generate an output indicative of the occurrence of said condition, said predetermined condition being an a.c. voltage signal, said means responsive to the occurrence of said voltage signal for generating said control voltage including voltage doubling rectifier means and capacitive storage means, said voltage doubling rectifier means having an input to which said voltage signal is applied and being connected at an output therefrom with said capacitive means for generating said control voltage thereacross, said oscillator means comprising a multivibrator circuit connected at an input thereto with said capacitive means for receiving said control voltage, said multivibrator having a nonoscillating and an oscillating state and being in said nonoscillating state whenever said control voltage has a value below said selected value and being in said oscillating state whenever said control voltage has a value at least equal to said selected value, whereby upon the occurrence of said a.c. voltage signal said oscillator is placed in its oscillating state after a first minimum period of time required for control voltage to increase in value to at least said selected value, said multivibrator when in said oscillating state generating at an output therefrom a signal indicative of the occurrence of said a.c. voltage signal, and including feedback means connected between said multivibrator output and said capacitive means and operative upon said multivibrator being in said oscillating state for a second period of time following said first period to maintain the value of said control voltage at at least said selected value irrespective of the presence or absence of said a.c. voltage signal to latch said multivibrator in said oscillating state.

4. A circuit as in claim 1, said feedback means comprising voltage doubler rectifier means connected between said multivibrator output and said capacitive means.

5. A circuit as in claim 3, including manually manipulable switch means connected with said capacitive means for selectively decreasing the value of the control voltage thereacross to below said selected value to unlatch said multivibrator and to place said multivibrator in its nonoscillating state, whereby the output from the multivibrator indicative of the occurrence of the voltage signal may be terminated.

6. A circuit as in claim 3, said circuit having first and second conductor means for being connected across a source of power for said circuit, said multivibrator circuit including first and second transistors having emitters connected with said first conductor means, first and second impedance means connecting collectors of said first and second transistors, respectively, with said second conductor means, a first capacitor connected between said collector of said first transistor and a base of said second transistor, third impedance means connecting said base of said second transistor with said second conductor means, and a second capacitor connected between said collector of said second transistor and a base of said first transistor, said first transistor base being connected with said control voltage and said second transistor collector being the output from said multivibrator.

7. A circuit as in claim 6, including feedback means comprising a third capacitor and first and second diodes, said third capacitor being connected on one side thereof with said collector of said second transistor and on the other side thereof with a cathode of said first diode and an anode of said second diode, an anode of said first diode being connected with said first conductor means and a cathode of said second diode being connected with said capacitive means, said feedback means maintaining the value of said control voltage at at least said selected value irrespective of the presence or absence of said predetermined condition to latch said multivibrator in said oscillating state.

8. A circuit as in claim 7, including fourth impedance means connected between said capacitive means and said first transistor base, fifth impedance means connected across said capacitive means to provide a discharge path therefor, and switch means connected with said capacitive means for selectively decreasing the value of the control voltage thereacross to below said selected value to unlatch said multivibrator and to place said multivibrator in its nonoscillating state.

* * * * *